Figure 1:
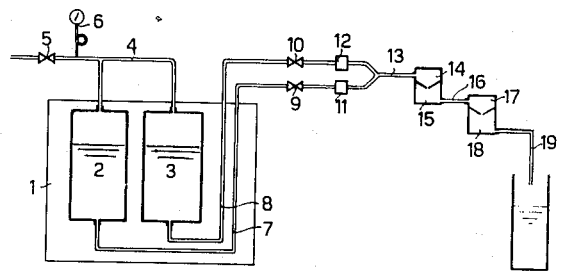

April 24, 1956     J. H. DE BOER ET AL     2,743,289
PROCESS OF EFFECTING EXOTHERMAL CHEMICAL REACTIONS
BETWEEN DIFFICULTLY MISCIBLE LIQUIDS
Filed May 23, 1952

INVENTORS
JAN. H. DE BOER
PIETER G. MEERMAN

By Cushman, Darby & Cushman

ATTORNEYS

United States Patent Office 2,743,289
Patented Apr. 24, 1956

2,743,289

PROCESS OF EFFECTING EXOTHERMAL CHEMICAL REACTIONS BETWEEN DIFFICULTLY MISCIBLE LIQUIDS

Jan H. De Boer, Kerensheide-Beek, and Pieter G. Meerman, Brunssum, Netherlands, assignors to Stamicarbon N. V., Heerlen, Netherlands Application May 23, 1952, Serial No. 289,613

Claims priority, application Netherlands May 30, 1951

11 Claims. (Cl. 260—417)

The invention relates to a process of effecting exothermal chemical reactions between at least two difficultly miscible liquids.

In particular the invention relates to a process of effecting exothermal chemical reaction between components present in at least two difficultly miscible liquids.

The liquids may constitute chemically reacting substances, or reacting substances may be dissolved or dispersed therein.

It is already known that many of such reactions proceed slowly, because the contacting surface area between the reacting phases is too small. In practice this drawback is partly eliminated by making use of a solvent in which both or all of the reacting substances are soluble and by employing stirring or mixing devices or by boiling.

The use of a solvent has the drawback that the solvent has subsequently to be removed. Unavoidable loss of solvent results and the solvent method may be expensive. Stirring devices have the disadvantage, especially where corrosive substances are present or if the reaction is to proceed under conditions in which air is excluded, that complicated apparatus is required.

It is known, however, that even if highly effective stirring or mixing devices are employed, an exothermal reaction between two or more immiscible or difficultly miscible liquids is often not completed, though the magnitude of the total heat effect might be expected to be sufficient to complete the reaction.

For this reason heat has to be supplied for carrying out such reactions and it is customary to boil the reacting mixture. As during boiling an internal flow of the reacting mixture is effected the employment of stirring devices may usually be obviated but with many reactions there is danger that the temperature may be unduly raised, and in some cases the elevated temperature may give rise to an undesirable shifting of the equilibrium or to undesirable side-reactions.

It is an object of the invention to provide an improved method of effecting exothermal chemical reactions between at least two difficultly miscible liquids.

Another object of the invention is to provide an improved method of accelerating exothermal chemical reactions between at least two difficultly miscible liquids by intimately intermingling these phases.

It is also the object of the invention to provide an improved method of completing exothermal chemical reactions between at least two difficultly miscible liquids.

Still another object of the invention is to provide an improved process of the preparation of soap from fat and lye.

A further object of the invention is to provide an improved process of sulfonating benzene or another aromatic compound.

Other objects of the invention will be apparent from the following description.

These and other objects of the invention are attained by subjecting the different liquids together to the high shearing stresses prevailing in a strong liquid vortex generated in the mixture. It was found that by this method such a fine intermingling of the reacting components can be attained, that after the reaction has set in, the amount of reaction heat generated in the reaction mixture per unit of volume and time is sufficient to accelerate and complete the reaction.

The rate of the reaction is normally sufficiently high without applying extra external heat e. g. boiling of the mixture.

It is according to the invention important that the dispersion resulting from the liquid vortex is maintained for a sufficient time as to achieve the desired reaction. It was found that usually this is the case. However, in other cases a stabilizer may be suitably added or may be formed during the reaction.

By a strong liquid vortex is meant a rapidly rotating liquid current ($a$) moving spirally inwards towards the rotation axis so that the angular velocity increases as the radius of rotation decreases and ($b$) of sufficient strength to generate high shearing stresses in the mixture.

According to the invention the liquid vortex is generated by supplying the liquids to be reacted separately or in the form of a coarse mixture under pressure to a rotation chamber, by which is meant a chamber bounded by a continuous surface of revolution and having one or two circular axially disposed discharge apertures and one or more feed conduits so constructed and directed that a liquid pressed through these conduits begins to rotate on a radius larger than the radius of the discharge apertures.

The rotation chamber may be a cylinder provided at one or each end with an adjoining cone the apex of which is provided with the discharge aperture or one of said apertures.

The supply liquid is preferably introduced under pressure into the rotation chamber through one or more tangential feed conduits, although the liquid may be supplied axially through an annular opening which is provided with vanes in such a manner that the infed liquid is brought into rotation in the chamber. Where the rotation chamber has a cylindrical portion and an adjoining conical portion the liquid may be fed through one or more tangential apertures into the cylindrical portion.

The immiscible or difficultly miscible liquids may be supplied to the rotation chamber in the form of a mixture or separately. Where one of the liquids is present in excess the other liquid may be supplied centrally, for instance in the manner described in the specification and illustrated in the drawing of the copending application No. 251,118, filed October 12, 1951, now United States Patent 2,653,801.

The pressure to be applied depends on the nature of the liquids which are to be reacted with one another and on the shape and size of the apparatus to be used. Generally speaking, it may be said that the pressure to be applied increases with the diameter of the rotation chamber and an increase in the capacity can therefore often advantageously be achieved by using rotation chambers arranged in parallel instead of employing a greater rotation chamber. If several rotation chambers are used it is of advantage that they have a common discharge conduit and/or common feed conduits for the mixture to be treated or for each of the components.

In practice pressures of 1–50 atm. gauge pressure have been employed.

In special cases it may be necessary to carry out the treatment in two or more stages; the rotation chambers may then be arranged in series so that the discharge of the rotation chamber(s) in the first stage debouches into the feed conduit of the second stage.

If desired, further reacting liquids may be added in this second stage. The rotation chambers of the second stage may have the same shape and the same dimensions as those of the first stage but it is often advantageous to choose smaller dimensions, as this makes it possible to reduce the particle size further while applying the same pressure.

In this case it is of advantage to provide the or each rotation chamber of the first stage with a diffuser, by which is meant a device for transforming kinetic energy of the discharged liquid into pressure energy, being a passage expanding from the appertaining discharge aperture. A passage having a virtual apex angle of 7° serves well but other forms may be employed as are described in the specification and illustrated in the drawings of the copending application No. 214,328, filed March 7, 1951.

The reacting mixture may be circulated by pumping and repeatedly passed through the rotation chamber.

It is not necessary that each of the immiscible or difficultly miscible liquids should be a homogeneous liquid. In one or more liquids, substances may be present in solution or dispersion, in which case these substances may be the reacting components or active catalysts.

In carrying out the process the reaction may set in whilst the mixture is in the rotation chamber but the reaction mainly proceeds outside the rotation chamber.

If the velocity of the reaction is too slow at normal temperature the reacting components or one or more of the reacting components may be heated to a higher temperature before being treated in the rotating chamber. If desired heating required for starting the reaction may take place after the treatment in the liquid vortex.

In some cases it may be advantageous to continue the application of heat during the reaction, but when the process according to the invention is employed the amount of heat is then much smaller than would otherwise be the case. The said process may be employed with advantage for reactions which at room temperature and under normal conditions proceed at sufficient velocity, but exhibit side-reactions which are avoidable by working at a lower temperature. The liquids to be mixed are in this case cooled before being introduced into the rotation chamber and/or the reacting mixture may be cooled during the reaction.

The process according to the invention is particularly important where it is necessary to work at an elevated or lowered pressure. In order to obtain the effect of the liquid vortex it is only necessary to ensure a continuous feed and discharge and a constant or regulable pressure difference between the feed to and the discharge from the rotation chamber.

Furthermore, it has been found that for carrying out the process according to the invention, it is important that the dispersion resulting from the liquid vortex treatment be preserved until the reaction is completed and it may be necessary to add to the reacting components a substance that has a stabilizing effect upon the emulsion formed. The substance chosen should be such that it can afterwards be easily removed should this be necessary.

This addition is not necessary where the resulting emulsion is sufficiently stable as it is or when one of the intermediate products, by-products or final products of the reaction has the desired emulsifying or stabilizing effect. By way of example in the preparation of soap from fat and lye the resulting soap stabilizes the fat emulsion formed.

Summarizing it can be said that the present invention in its broadest form consists in a process of effecting exothermal chemical reactions between two or more immiscible or difficulty miscible liquids by supplying the reaction components separately or in the form of a coarse mixture under such pressure to a rotation chamber as herein defined as to generate therein a liquid vortex as herein defined which causes intimate mingling of the reaction components to accelerate or promote a complete or more nearly complete subsequent reaction between said components and maintaining the dispersion resulting from the cyclonic treatment for a sufficient time and under such temperature conditions as to achieve the desired reaction wholly or mainly after the dispersion has left the chamber.

The process according to the invention will be further explained with the help of two examples, relating to the preparation of soap and of benzenesulfonic acid, respectively.

Example 1

For the preparation of soap use was made of an apparatus schematically represented in Figure 1.

Two stainless steel vessels 2 and 3 are arranged in a container 1, filled with a heat transmitting agent, for instance water. Conduits 4 are connected to the tops or upper parts of the vessels, and compressed air can be admitted through the conduits past the valve 5 into the vessels. The pressure exerted on the vessels can be read from the manometer 6. On the lower side two discharge pipes 7 and 8 respectively are provided, which may be shut off by means of the regulating valves 9 and 10 respectively. These two pipes, in which two flowmeters 11 and 12 respectively are provided, are joined to form a tube 13, debouching tangentially into the rotation chamber 14. The discharge of this rotation chamber debouches into the closed vessel 15, the discharge pipe 16 of which debouches again tangentially into a rotation chamber 17. The discharge of this rotation chamber debouches into the closed space 18, to which a discharge conduit 19 is connected.

In the tests the rotation chambers 14 and 17 had the same shape and dimensions. Each of the rotation chambers comprised a cylindrical part having a diameter of 15 mm. and a height of 10 mm., and an adjoining conical section which had a half apex angle of $37\frac{1}{2}°$. The apex of the cone was provided with a central apex aperture having a diameter of 3 mm. The diameter of the feed aperture was also 3 mm.

The vessels 2 and 3 were filled with 1200 grams of beef tallow with a saponification value of 200 and with a solution of 175 grams of NaOH in 1.4 litres of water respectively. The water in the vessel 1 was kept at a temperature of 100° C. At a pressure of 15 atm. gauge pressure both liquids were at the same time forced through the conduits 7 and 8 and coarsely mixed in the pipe 13. The ratio was regulated by means of the regulating valves 9 and 10 and checked with the aid of the flowmeters 11 and 12. The mixture then passed through the two rotation chambers 14 and 17 and was discharged through 19. It was found that immediately after the mixture had been passed through these rotation chambers, 42% of the mixture had been saponified. Without further addition of heat the saponification became complete within a short time. The resulting soap was easily separated by salting out in the usual manner, in which process a good product was obtained.

By employing rotation chambers of a smaller diameter, in which case the capacity can be increased if desired by using several rotation chambers in parallel, it is possible to form a still finer emulsion and the saponification can thereby be further accelerated. It is also possible to employ more than two rotation chambers in succession although if too many successive chambers are used the reaction mixture becomes too viscous for the formation of an effective current.

Example 2

Figure 2:
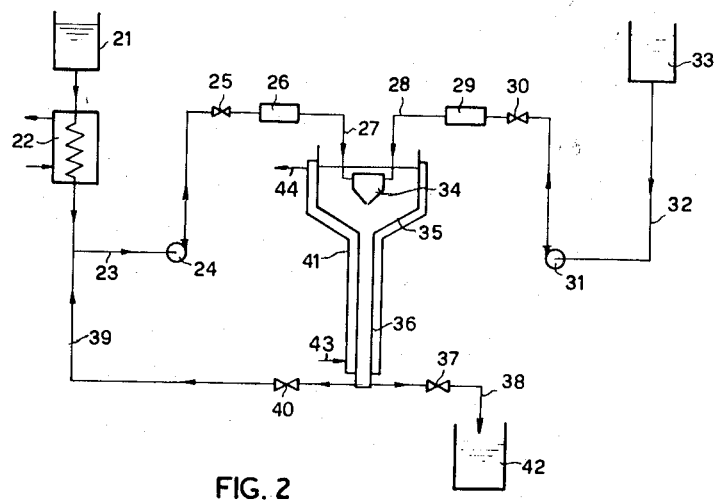

For the preparation of benzene sulfonic acid from benzene and 96% $H_2SO_4$ use was made of an apparatus as represented schematically in Figure 2.

The vessels 21 and 33 are the storage tanks for sulfuric acid and benzene respectively.

The pump 24 aspirates the sulfuric acid through the heat-exchanger 22 and the suction pipe 23 whereafter passing a valve 25 and a flowmeter 26, it is forced through the feed pipe 27 of the rotation chamber 34, into which this feed pipe debouches tangentially. Via a second tangentially directed feed pipe 28 the benzene is supplied by the pump 31 by way of the valve 30 and the flowmeter 29. The benzene is aspirated from the tank 33 through the suction pipe 32.

The rotation chamber has the following dimensions:

| | |
|---|---|
| Diameter of the rotation chamber_____mm__ | 14 |
| Length of the cylindrical section_____mm__ | 11 |
| Diameter of the feed apertures_____mm__ | 5 |
| Diameter of the discharge aperture_____mm__ | 4 |
| Half apex angle, °_____ | 30 |

This rotation chamber discharges below the liquid level in the reaction vessel 35 the lower part of which converges to a tube 36. This tube connects with a discharge pipe 38 having a valve 37 and opening into the tank 42. Furthermore there is a return conduit 39 having a valve 40, which enables all or part of the reacting liquid to be recycled. The vessel 35 with the tube 36 is enveloped by a jacket 41 provided with feed and discharge conduits 43 and 44 respectively for heating or cooling purposes.

In the tests the feed pressure into the rotation chamber was about 2½ atm. gauge pressure.

The valves 25 and 30 were so adjusted that benzene and $H_2SO_4$ were supplied at a weight ratio of about 1:3.

The quantity of benzene treated with this apparatus was about 60 kg. per hour. By varying the temperature of the heat exchanger 22 the temperature of the sulfuric acid could be varied between 10° and 100° C.

The following results were obtained.

When the sulfuric acid was preheated to 70° C. sulfonation proceeded very rapidly and within a short time the boiling point of benzene was reached in the vessel, with the result that the fine emulsion frothed over. Only by rapid cooling could the reaction be controlled. The yield amounted to about 90%, calculated on benzene. At a temperature of the sulfuric acid of 50° C., the reaction proceeded calmly and yet at a sufficient rate. The temperature of the cooling liquid in the jacket 41 was in this case kept between 50° and 60° C. After a reaction period of 10 minutes the conversion had been completed up to 75%. During the following hour another quantity, about 5%, was found to react, so that the total yield became about 80%. This lower yield was due to the fact that the originally formed emulsion was partly separated. When 1% of benzene sulfonic acid was added to the benzene or to the sulfuric acid, the yield rose to well over 90%. The added benzene sulfonic acid had acted as an emulsifying agent.

The same result could be obtained by recycling 10% of the reacting mixture through the conduit 39. If the reaction was carried out at normal room temperature and the reaction vessel 35 and the tank 42 were heat-insulated it was found that, if 2% of benzene sulfonic acid was added to the benzene, the reaction set in rather slowly. The temperature gradually rose to a maximum of 50° C. and after 10 hours 70% of the benzene had been converted into benzene sulfonic acid. If no benzene sulfonic acid was added, the benzene gradually separated from the acid thereby stopping the reaction.

For a comparison it may be said that, if a mixture of benzene and 96% sulfuric acid in the ratio of 1:3 is stirred at 70° C. under regular heating, little or no sulfonic acid is formed.

We claim:

1. Process of effecting exothermal chemical reactions between at least two difficultly miscible liquids which comprises intermingling said liquids under the influence of a strong vortical movement generated by introducing said liquids under pressure substantially tangentially into a rotation chamber, having at least one centrally arranged discharge aperture whereby a very fine dispersion is formed, and maintaining the dispersion under reaction conditions to effect the desired reaction.

2. Process according to claim 1, in which the liquids are separately introduced into the rotation chamber.

3. Process according to claim 1, in which the liquids are supplied to the rotation chamber in the form of a coarse mixture.

4. Process according to claim 1, in which the reaction takes place in the presence of a stabilizer for the dispersion formed.

5. Process according to claim 4, in which the stabilizer is formed as a product of the reaction between the liquids.

6. Process of effecting exothermal chemical reactions between at least two difficultly miscible liquids which comprises intermingling said liquids under the influence of a strong vortical movement, generated by introducing said liquids under pressure substantially tangentially into a rotation chamber, having at least one centrally arranged discharge aperture whereby a very fine dispersion is formed repeating this treatment at least one time and maintaining the dispersion under reaction conditions to effect the desired reaction.

7. Process according to claim 6, in which the dispersion formed is recycled through the same apparatus in which the vortical movement is generated.

8. Process according to claim 1, in which the reaction is assisted by the withdrawal of heat.

9. Process for the preparation of soap from fat and lye in which at a temperature exceeding 80° C. fat and lye are intermingled under the influence of a strong vortical movement generated by introducing said components under pressure substantially tangentially into a rotation chamber having at least one centrally arranged discharge aperture and maintaining the dispersion formed at 80° C.

10. Process for the preparation of aromatic sulfonic acid in which an aromatic hydrocarbon and sulfuric acid are intermingled under the influence of a strong vortical movement generated in a rotation chamber by introducing said components under pressure substantially tangentially into a rotation chamber, having at least one centrally arranged discharge aperture and maintaining the dispersion formed at a temperature high enough to achieve the sulfonation.

11. Process for the preparation of benzene sulfonic acid in which benzene and sulfuric acid are intermingled at a temperature between 40° C. and 70° C. under the influence of a strong vortical movement generated in a rotation chamber by introducing said components under pressure substantially tangentially into a rotation chamber having at least one centrally arranged discharge aperture and maintaining the temperature lower than 70° C.

References Cited in the file of this patent

UNITED STATES PATENTS

| | | |
|---|---|---|
| 885,766 | De Laval | Apr. 28, 1908 |
| 2,335,457 | Sender | Nov. 30, 1943 |
| 2,441,613 | Balassa | May 18, 1948 |